(12) United States Patent
Plennevaux et al.

(10) Patent No.: US 11,279,892 B2
(45) Date of Patent: Mar. 22, 2022

(54) PROCESS FOR THE HYDROCRACKING OF HYDROCARBON FEEDSTOCKS

(71) Applicant: IFP Energies nouvelles, Rueil-Malmaison (FR)

(72) Inventors: Thomas Plennevaux, Rueil-Malmaison (FR); Thierry Gauthier, Rueil-Malmaison (FR); Patrick Bourges, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 31 days.

(21) Appl. No.: 16/396,915

(22) Filed: Apr. 29, 2019

(65) Prior Publication Data
US 2019/0330546 A1    Oct. 31, 2019

(30) Foreign Application Priority Data

Apr. 27, 2018 (FR) .................................... 18/53.743

(51) Int. Cl.
*C10G 69/00* (2006.01)
*C10G 69/02* (2006.01)

(52) U.S. Cl.
CPC ....... *C10G 69/02* (2013.01); *C10G 2300/104* (2013.01); *C10G 2300/1011* (2013.01);
(Continued)

(58) Field of Classification Search
CPC ........ C10G 65/12; C10G 45/02; C10G 69/02; C10G 47/00; C10G 2300/4012;
(Continued)

(56) References Cited

U.S. PATENT DOCUMENTS 6,217,746 B1 * 4/2001 Thakkar ................. C10G 65/10
                                                                 208/100
9,399,741 B2    7/2016 Zink et al.
(Continued)

FOREIGN PATENT DOCUMENTS

FR      3027912 A1    5/2016
WO     15054202 A2    4/2015

OTHER PUBLICATIONS

Search report in corresponding FR1853743 dated Nov. 9, 2018. (pp. 1-2).

*Primary Examiner* — Prem C Singh
*Assistant Examiner* — Brandi M Doyle
(74) *Attorney, Agent, or Firm* — Millen, White, Zelano and Branigan, P.C.; Harry B. Shubin

(57) ABSTRACT

A hydrocracking process:
  A. hydrotreating HDT the feedstocks,
  B. gas/liquid separation of effluent from A with a separation device having a chamber compartmentalized into an upstream degassing compartment and a downstream stripping compartment, the passage of the degassed liquid from the degassing compartment to the stripping compartment being provided by an opening made in the internal wall and/or by overflowing above the said internal wall separating the said compartments,
  C. hydrodesulfurization of gaseous effluent obtained in B and of an external feedstock,
  D. a first hydrocracking of liquid effluent resulting from B,
  E. gas/liquid separation of liquid effluent from D and of the liquid effluent from C,
  F. a fractionation of liquid effluent from E,
  G. a second hydrocracking of unconverted liquid fraction from F.

13 Claims, 4 Drawing Sheets

(52) U.S. Cl.
CPC ............... *C10G 2300/1074* (2013.01); *C10G 2300/1077* (2013.01); *C10G 2300/4006* (2013.01); *C10G 2300/4012* (2013.01); *C10G 2400/06* (2013.01)

(58) Field of Classification Search
CPC ...... C10G 2300/1011; C10G 2300/104; C10G 2300/1074; C10G 2300/4006; C10G 2300/1077; C10G 2400/06
See application file for complete search history.

(56) References Cited

U.S. PATENT DOCUMENTS

| | | | |
|---|---|---|---|
| 2008/0060976 A1* | 3/2008 | Brierley | C10G 65/14 208/57 |
| 2015/0152343 A1* | 6/2015 | Vijay | C10G 69/08 208/60 |
| 2016/0122666 A1 | 5/2016 | Weiss et al. | |

* cited by examiner

PROCESS FOR THE HYDROCRACKING OF HYDROCARBON FEEDSTOCKS

FIELD OF THE INVENTION

The hydrocracking of heavy petroleum cuts is a key process in refining which makes it possible to produce, from surplus and not readily upgradable heavy feedstocks, lighter fractions, such as petrols, jet fuels and light gas oils, which the refiner is looking for in order to adjust his production to demand. Some hydrocracking processes make it possible to also obtain a highly purified residue which can constitute excellent bases for oils or a feedstock readily upgradeable in a catalytic cracking unit, for example. One of the effluents particularly targeted by the hydrocracking process is the middle distillate or MD (fraction which contains the gas oil cut and the kerosene cut).

The process for hydrocracking vacuum distillates or VDs makes it possible to produce light cuts (gas oil, kerosene, naphthas, and the like) which are more upgradeable than the VD itself. This catalytic process does not make it possible to completely convert the VD into light cuts. After fractionation, there thus remains a more or less significant proportion of unconverted VD fraction, named UCO or UnConverted Oil. In order to increase the conversion, this unconverted fraction can be recycled at the inlet of the hydrotreating reactor or at the inlet of the hydrocracking reactor. The recycling of the unconverted fraction at the inlet of the hydrotreating reactor or at the inlet of the hydrocracking reactor makes it possible both to increase the conversion but also makes it possible to increase the selectivity for gas oil and kerosene. Another way of increasing the conversion while maintaining the selectivity is to add a conversion or hydrocracking reactor to the loop for recycle of the unconverted fraction to the section for high-pressure separation. This reactor and the associated recycle constitutes a second hydrocracking stage. As this reactor is located downstream of the fractionation section, it operates with not very much sulfur ($H_2S$) and not very much nitrogen, which makes it possible to optionally use catalysts which are less sensitive to the presence of sulfur while increasing the selectivity of the process.

This is because the "two-stage" hydrocracking comprises a first stage which has the objective, as in the "single-stage" process, of carrying out the hydrorefining of the feedstock but also of achieving a conversion of the latter of the order generally of 30% to 70%. The effluent resulting from the first stage is subsequently subjected to a fractionation (distillation) which has the objective of separating the conversion products from the unconverted fraction. In the second stage of a two-stage hydrocracking process, only the fraction of the feedstock not converted during the first stage is treated. This separation makes it possible for a two-stage hydrocracking process to be more selective with regard to diesel oil than a single-stage process at an equivalent overall degree of conversion. This is because the intermediate separation of the conversion products prevents them from "overcracking" to give naphtha and gas in the second stage over the hydrocracking catalyst. Furthermore, it should be noted that the unconverted fraction of the feedstock treated in the second stage generally contains very small contents of $NH_3$ and also of organic nitrogenous compounds, generally less than 20 ppm by weight, indeed even less than 10 ppm by weight.

The process for the hydrodesulfurization of gas oils makes it possible to reduce the amount of sulfur present in a gas oil cut while minimizing the conversion of the feedstock into lighter products (gas, naphtha). The feedstock of the hydrodesulfurization can consist of straight run gas oil or gas oil resulting from the atmospheric fractionation of a crude oil, of light vacuum gas oil or light vacuum distillate, of LCO or of distillate resulting from a conversion process (FCC, coker, and the like), of a gas oil feedstock resulting from the conversion of biomass (for example esterification), alone or as a mixture, for example. The partial hydrogen pressure required for this process is lower than the partial hydrogen pressure in the hydrocracker. It is common for these two processes to be present in one and the same refinery without being integrated. However, they are based on very similar processing schemes composed of a feedstock furnace, of fixed bed reactors, of hydrogen recycle compressors and of high-pressure separation sections which are more or less complex.

PRIOR ART

U.S. Pat. No. 7,005,057 describes a single-stage hydrocracking process for the production of diesel oil having an ultralow sulfur content, the process using a liquid/vapour separation in a separator, downstream of the hydrocracking reactor. Hydrogen is injected into the separator in question but the separator itself is conventional.

U.S. Pat. No. 7,686,941 relates to the simultaneous hydrocracking of multiple feedstocks. It describes a process using a liquid/vapour separation downstream of a hydrotreating reactor. The gas effluent from the separator is treated, for example, in a hydrodesulfurization reactor, the liquid effluent being treated in a hydrocracking reactor. External feedstocks can be mixed with these two effluents in order to be cotreated in reactors downstream of the preceding ones. The separation stage remains conventional and is not described in detail.

Furthermore, there exist numerous separator designs, including, for example, that described in Patent EP 1 086 734, which provides a separation with three different sections:
  a primary separator for the fluid flows to be separated, the ratio of the gas to liquid flow rates by weight G/L of which is between 0.1 and 10, and composed of a pipe terminated by at least one tangential outlet imposing a rotation of 90° on the flow,
  a secondary separator for the fluid flows to be separated, the ratio G/L of which is between 10 and 20, and composed of a cyclone having a free tangential inlet,
  and finally a system limiting the formation of liquid vortex in a third section.

This separator is effective; however, it can still be improved, in particular in the case where the relative volatilities of the products to be separated are low.

The aim of the invention is thus to improve a two-stage hydrocracking process. The aim of the invention is in particular to limit the cracking of the feedstock when it is of gas oil type in the hydrotreating stage and to improve the selectivity for and the yields of middle distillates of the process.

SUMMARY OF THE INVENTION

The invention consists in integrating a two-stage hydrocracking process with a process for the hydrodesulfurization of gas oils using an innovative gas/liquid separator inserted into the first hydrocracking stage which makes it possible to recover in particular at least a part of the diesel oil formed upstream of the said separator. The top product from the separator is treated in a hydrodesulfurization section and the bottom product from the separator is treated in a hydrocracking section. The invention makes it possible to increase the yield of middle distillates MDs while preventing "overcracking" of the compounds from the top of the separator.

It has thus been discovered, in the context of the present invention, that the use of such a separator, in an intermediate manner, in the first hydrocracking stage, makes it possible, in comparison with the cotreatment of a feedstock of VGO type and of a feedstock of gas oil type, and directly as a mixture in a two-stage hydrocracking process:
- to limit the cracking of the feedstock of gas oil type in the second part of the first hydrocracking stage located downstream of the separator and to maximize the selectivity of the process,
- to limit the concentration of nitrogen and of sulfur in the second part of the first hydrocracking stage located downstream of the separator, which optimizes the said stage,
- and to thus increase the selectivity for and the yield of middle distillates of the process.

More specifically, a subject-matter of the invention is first of all a process for the hydrocracking of hydrocarbon feedstocks containing at least 20% by volume and preferably at least 80% by volume of compounds boiling above 340° C., the said process comprising at least the following stages:
  A. The hydrotreating HDT of the said feedstocks, which is carried out in the presence of hydrogen and of at least one hydrotreating catalyst,
  B. A gas/liquid separation S1 of the effluent from stage A with a separation device which comprises a chamber compartmentalized into an upstream degassing compartment and a downstream stripping compartment, the passage of the degassed liquid from the degassing compartment to the stripping compartment being provided by at least one opening made in the internal wall and/or by overflowing above the said internal wall separating the said compartments, so as to obtain, on the one hand, a gaseous effluent comprising hydrogen and a middle distillate MD fraction and, on the other hand, a liquid effluent,
  C. A hydrodesulfurization HDS of the gaseous effluent obtained in stage B and of an external liquid hydrocarbon feedstock, of the middle distillate MD type, for example of gas oil type,
  D. A first hydrocracking HCK1 of the liquid effluent resulting from stage B in the presence of hydrogen and of a hydrocracking catalyst,
  E. A second gas/liquid separation S2 of the liquid effluent obtained in stage D and of the liquid effluent obtained in stage C in order to produce a liquid effluent and a gaseous effluent comprising at least hydrogen,
  F. A fractionation of the liquid effluent resulting from stage E into at least one effluent comprising the converted hydrocarbon products having boiling points of less than 340° C. and an unconverted liquid fraction having a boiling point of greater than 340° C.,
  G. A second hydrocracking HCK2 of the unconverted liquid fraction resulting from stage F in the presence of hydrogen and of a hydrocracking catalyst.

Preferably, stage B carries out a first gas/liquid separation S1 of the effluent obtained in stage A with the separation device, which comprises:
  the single chamber delimited by external walls and comprising an external inlet for the fluid, an external liquid outlet and an external gas outlet, the chamber being oriented along a substantially vertical or oblique axis and being compartmentalized into at least two compartments using at least one wall internal to the chamber and oriented substantially along the said axis,
  the compartments comprising an upstream degassing compartment and a downstream stripping compartment,
  the degassing compartment being in fluidic connection with, on the one hand, the external inlet for the effluent to be separated and with, on the other hand, a first gas outlet and a degassed liquid outlet,
  the stripping compartment being in fluidic connection with an inlet for the said degassed liquid, a stripping medium inlet, a second gas outlet and a liquid outlet,
  the first and second gas outlets being in fluidic connection with the external gas outlet of the chamber,
  the liquid outlet of the stripping compartment being in fluidic connection with the external liquid outlet of the chamber,
  the passage of the degassed liquid from the outlet of the degassing compartment to the inlet of the stripping compartment being provided by at least one opening made in the internal wall and/or by overflowing above the said internal wall separating the said compartments, so as to obtain, on the one hand, a gaseous effluent comprising hydrogen and a middle distillate MD fraction and, on the other hand, a liquid effluent.

One advantage of the present invention is thus that of having developed a process integrating a two-stage hydrocracking process with a process for the hydrodesulfurization of gas oils which makes it possible to limit the cracking of the feedstock of gas oil type and of the middle distillates formed during the first hydrotreating stage and thus to maximize the selectivity for and the yields of middle distillates of the process.

Another advantage of the present invention is that of having developed such a process which makes it possible, by the use of an improved separator, to limit the amount of hydrogen disulfide and of ammonia in contact with at least a part of the hydrocracking catalyst of stage D, these two compounds being inhibitors of catalysts, which tend to limit their activity and/or their selectivity.

Generally, the operating conditions of the process, such as temperature, pressure, degree of hydrogen recycling or hourly space velocity, can be highly variable depending on the nature of the feedstock, on the quality of the products desired and on the plants which the refiner has available.

Preferably, the process according to the invention also provides a stage H of compression of the gaseous effluent comprising at least hydrogen obtained in the separation S2 stage E before its recycle in at least one of the following stages: the hydrotreating HDT stage A, the hydrodesulfurization HDS stage C, the first hydrocracking HCK1 stage D.

Preferably, at least a part of the effluent obtained in the hydrocracking HCK2 stage G is sent to be separated in the separation S2 stage E.

Advantageously, the hydrocarbon feedstocks treated in the said process and sent to the hydrotreating stage A are chosen from the hydrocarbon feedstocks containing at least 20% and in particular at least 80% by volume of compounds boiling above 340° C. and in particular between 370 and 580° C. (that is to say, corresponding to compounds containing at least 15 to 20 carbon atoms).

Advantageously, the hydrocarbon feedstocks treated in the said process and sent to the hydrotreating stage A are chosen from vacuum distillates VDs (or VGO for Vacuum Gas Oil), such as, for example, the gas oils resulting from the direct distillation of crude or from conversion units, such as the FCC, the coker or the visbreaking, and also feedstocks originating from units for the extraction of aromatics from lubricating oil bases or resulting from the solvent dewaxing of lubricating oil bases, or also distillates originating from the desulfurization or hydroconversion of ATRs (atmospheric residues) and/or VRs (vacuum residues), or also the feedstock can advantageously be a deasphalted oil, or feedstocks resulting from biomass or also any mixture of the abovementioned feedstocks. The above list is not limiting. In general, the said feedstocks have a starting boiling point of greater than 340° C. and preferably of greater than 370° C.

The said hydrocarbon feedstocks can contain heteroatoms, such as sulfur and nitrogen. The nitrogen content is normally between 1 and 8000 ppm by weight, more generally between 200 and 5000 ppm by weight, and the sulfur content between 0.01% and 6% by weight, more generally between 0.2% and 5% by weight and more preferably still between 0.5% and 4% by weight.

The said feedstock treated in the process according to the invention and sent to stage A can optionally contain metals. The cumulative content of nickel and vanadium of the feedstocks treated in the processes according to the invention is preferably less than 1 ppm by weight. The asphaltenes content is generally less than 3000 ppm by weight, preferably less than 1000 ppm by weight and more preferably still less than 200 ppm by weight.

In the case where the feedstock contains compounds of resin and/or asphaltene type, it is advantageous to pass the feedstock beforehand over a bed of catalyst or of adsorbent different from the hydrocracking or hydrotreating catalyst.

In accordance with the invention, the hydrotreating stage A is carried out in the presence of at least one hydrotreating catalyst. Preferably, the hydrotreating catalyst is chosen from conventional hydrotreating catalysts known to a person skilled in the art. Preferably, the said hydrotreating stage A is advantageously carried out under conventional hydrorefining conditions, in particular in the presence of hydrogen and of a hydrotreating catalyst and at a temperature of between 200 and 400° C., in particular between 200 and 390° C., under a pressure of between 2 and 16 MPa, at a space velocity of between 0.2 and 5 $h^{-1}$ and with an amount of hydrogen introduced such that the litre of hydrogen/litre of hydrocarbon ratio by volume is between 100 and 2000 l/l.

Conventional hydrotreating catalysts can advantageously be used, preferably which contain at least one amorphous support and at least one hydro/dehydrogenating element chosen from at least one non-noble element from Groups VIb and VIII, and generally at least one element from Group VIb and at least one non-noble element from Group VIII. Preferably, the amorphous support is alumina or silica/alumina. Preferred catalysts are chosen from the catalysts NiMo on alumina, and NiMo or NiW on silica/alumina.

These operating conditions used in stage A of the process according to the invention generally make it possible to achieve levels of conversion of the organic nitrogen into ammonia which are compatible with their injection into the downstream hydrocracking stage: The effluent resulting from the hydrotreating stage A and entering the separation stage B comprises a nitrogen content preferably of less than 300 ppm by weight and preferably of less than 50 ppm by weight.

Preferably, stage D of the first hydrocracking HCK1 and/or the second hydrocracking HCK2 stage G are carried out at a temperature of between 320 and 450° C., under a pressure of between 3 and 20 MPa, at a space velocity of between 0.2 and 4 $h^{-1}$ and with an amount of hydrogen introduced such that the litre of hydrogen/litre of hydrocarbon ratio by volume is between 200 and 2000 l/l.

Preferably, the unconverted liquid fraction resulting from stage F used in the hydrocracking HCK2 stage G comprises at least 95% by weight of compounds boiling at a boiling point of between 150 and 380° C.

Advantageously, the external liquid hydrocarbon feedstock treated in the hydrodesulfurization HDS stage C is chosen from the straight run gas oil resulting from the direct distillation of a crude oil, light vacuum gas oil or light vacuum distillate, and the liquid hydrocarbon feedstocks resulting from a coking unit, preferably coker gas oil, from a visbreaking unit, from a steam cracking unit and/or from a catalytic cracking (Fluid Catalytic Cracking) unit, preferably LCOs (Light Cycle Oils) or light gas oils resulting from a catalytic cracking unit, and a gas oil feedstock resulting from the conversion of biomass, the said feedstocks being taken alone or as a mixture. The remainder of the feedstock is formed of a hydrocarbon feedstock composed of at least one gaseous effluent obtained in the separation S1 stage B and of hydrogen.

Preferably, the chamber of the separation device S comprises a third scrubbing compartment c, downstream of the first two compartments a,b, and positioned above them in the chamber, and optionally comprising a coalescer pad.

Advantageously, the separation S1 stage B is carried out with the following successive substages:
  a stage of degassing the fluid to be separated into a liquid phase and into a gas phase by getting the fluid closer to its thermodynamic equilibrium in the first degassing compartment a,
  a stage of stripping by injection of a stripping medium in order to evaporate a part at least of the light components dissolved in the liquid obtained by the degassing stage in the stripping compartment b,
  optionally a stage of scrubbing by injection of a scrubbing medium in order to condense the heavy compounds resulting from the degassing and/or stripping stage in the scrubbing compartment c, when it is present.

Preferably, the separation S1 stage B is carried out so that the section for passage of the fluid in the degassing compartment a and/or in the stripping compartment b, and/or in the scrubbing compartment c, when it is present, is chosen to be sufficient to limit the velocity of the gas below the critical velocity for entrainment of the droplets, preferably below 90% or below 80% of the said critical velocity.

Preferably, the gas/liquid separation stage B is carried out in the separator (also known as separation device in the present text) according to the invention operating at high-temperature high-pressure, operating at a temperature of between 50 and 450° C., preferably between 100 and 400° C., more preferably still between 200 and 300° C., and a pressure corresponding to the outlet pressure of the effluent obtained in the hydrotreating stage A decreased by the pressure drops.

The innovative design of the separator makes it possible to limit the amount of dissolved middle distillates sent to stage D. The middle distillates are the products of interest of this process and to send them to stage D would result in their partial overcracking. This new separator for stage B makes it possible to maximize the selectivity of the process and its yield of middle distillates. Furthermore, this separator makes it possible to limit the amount of hydrogen disulfide and of ammonia sent to stage D: These components are inhibitors of the hydrocracking reactions; not sending them to stage D makes it possible to improve the processing of this stage by reducing the residence time for an equivalent catalytic cycle time, the cycle time being defined as the period between two replacements of catalyst. This new separator also makes it possible to limit the flow rate by volume feeding the section where stage D is carried out, which has the direct effect of reducing its volume and thus the capital costs associated with the design of this section.

Preferably, the stripping stream injected into the separator according to the invention corresponds to the flow rate of makeup hydrogen of the hydrocracking process. Optionally, the stripping medium stream can be composed of light (C1-C4) hydrocarbons, of light petrol or any other vapour stream under the operating conditions of the separator.

Preferably, the scrubbing oil stream injected into the separator according to the invention, when the latter also comprises a scrubbing compartment, is a stream resulting from the fractionation stage F, for example a part of the unconverted oil, or a stream of vacuum distillates in the case where stage F takes place with a vacuum distillation. The scrubbing oil stream can also be deasphalted oil (DAO), aromatic oil resulting from a catalytic cracking or any other feedstock compatible with stages C and D. In particular, the scrubbing oil should preferably be poor in nitrogenous compounds, preferably have a nitrogen content of less than 300 ppm by weight and preferably less than 50 ppm by weight.

In accordance with the invention, the hydrocracking HCK1 stage D is carried out in the presence of at least one hydrocracking catalyst. Preferably, the hydrocracking catalyst is chosen from conventional hydrocracking catalysts known to a person skilled in the art. The hydrocracking catalysts used in the hydrocracking processes are all of the bifunctional type combining an acid function with a hydrogenating function.

The acid function is contributed by supports having high surface areas (150 to 800 $m^2 \cdot g^{-1}$ generally) exhibiting a surface acidity, such as halogenated (in particular chlorinated or fluorinated) aluminas, combinations of boron and aluminium oxides, amorphous silicas/aluminas and zeolites.

The hydrogenating function is contributed either by one or more metals from Group VIII of the Periodic Table of the Elements or by a combination of at least one metal from Group VIb of the Periodic Table and at least one metal from Group VIII. Preferably, the hydrocracking catalyst or catalysts comprise a hydrogenating function comprising at least one metal from Group VIII chosen from iron, cobalt, nickel, ruthenium, rhodium, palladium and platinum and preferably cobalt and nickel and/or at least one metal from Group VIb chosen from chromium, molybdenum and tungsten, alone or as a mixture, and preferably from molybdenum and tungsten. Preferably, the content of metal from Group VIII in the hydrocracking catalyst or catalysts is advantageously between 0.5% and 15% by weight and preferably between 2% and 10% by weight, the percentages being expressed as percentage by weight of oxides. Preferably, the content of metal from Group VIb in the hydrocracking catalyst or catalysts is advantageously between 5% and 25% by weight and preferably between 15% and 22% by weight, the percentages being expressed as percentage by weight of oxides.

The catalyst or catalysts can also optionally comprise at least one promoter element deposited on the catalyst and chosen from the group formed by phosphorus, boron and silicon, optionally at least one element from Group VIIa (chlorine, fluorine are preferred), and optionally at least one element from Group VIIb (manganese preferred), optionally at least one element from Group Vb (niobium preferred).

Preferably, the hydrocracking catalyst or catalysts used in stage D comprise an acid function chosen from alumina, silica/alumina and zeolites, preferably chosen from zeolites Y, and preferably chosen from silica/alumina and zeolites. A preferred catalyst used in stage D comprises and preferably consists of at least one metal from Group VI and/or at least one non-noble metal from Group VIII, a zeolite Y and alumina. An even more preferred catalyst comprises and preferably consists of nickel, molybdenum, a zeolite Y and alumina. Another preferred catalyst comprises, and preferably consists of, nickel, tungsten, alumina or silica/alumina.

In stage D of the process according to the invention, the conversion into products having boiling points of less than 340° C. and even of less than 370° C. is advantageously greater than 20% and preferably greater than 30% and more preferably still between 30% and 80% and preferably between 40% and 60%.

In accordance with the invention, the process comprises a stage D of gas/liquid separation of the effluent resulting from stage E, preferably as a mixture with the effluent resulting from stage C, to produce a liquid effluent and a gaseous effluent comprising at least hydrogen. Preferably, the gas/liquid separation stage E is carried out in a high-temperature high-pressure separator operating at a temperature of between 50 and 450° C., preferably between 100 and 400° C., more preferably still between 200 and 300° C., and a pressure corresponding to the outlet pressure of stage A decreased by the pressure drops.

In accordance with the invention, the process comprises an optional but preferred compression stage H where the gaseous effluent obtained in the separation stage E and comprising at least hydrogen is compressed, before its recycle in at least the hydrotreating stage A. This stage H is of use in making possible the recycle of the gas upstream, that is to say in the hydrotreating stage A, thus at higher pressure.

The gaseous effluent comprising at least hydrogen can advantageously be mixed with makeup hydrogen before or after its introduction into the compression stage H, preferably via a makeup hydrogen compressor.

According to an alternative form, a part of the gaseous effluent comprising at least compressed hydrogen can also advantageously be sent to stages A, D and/or C.

In accordance with the invention, the process comprises a stage F of fractionation of the liquid effluent resulting from stage E into at least one effluent comprising converted hydrocarbon products having boiling points of less than 340° C., preferably of less than 370° C. and in a preferred way of less than 380° C. and an unconverted liquid fraction (also known as UCO or unconverted oil) having a boiling point of greater than 340° C., preferably of greater than 370° C. and in a preferred way of greater than 380° C.

Preferably, the said fractionation stage F comprises a first separation stage comprising a separation means, such as, for example, a knockout drum or a steam stripper, preferably operating at a pressure of between 0.5 and 2 MPa, the aim of which is to carry out a separation of the hydrogen sulfide $H_2S$ from at least one hydrocarbon effluent produced during the hydrotreating stage A or the hydrocracking stages D and G. The hydrocarbon effluent resulting from this first separation can advantageously be subjected to an atmospheric distillation and, in some cases, to the combination of an atmospheric distillation and of a vacuum distillation. The aim of the distillation is to carry out a separation between the converted hydrocarbon products, that is to say generally having boiling points of less than 340° C., preferably of less than 370° C. and in a preferred way of less than 380° C., and an unconverted liquid fraction (residue) (UCO). According to another alternative form, the fractionation stage F is carried out only with an atmospheric distillation column.

The converted hydrocarbon products having boiling points of less than 340° C., preferably of less than 370° C. and preferably of less than 380° C. are advantageously distilled at atmospheric pressure in order to obtain several converted fractions having a boiling point of at most 340° C., and preferably a light C1-C4 gas fraction, at least one petrol fraction and at least one kerosene and gas oil middle distillates fraction. The liquid fraction, unconverted residue, (UCO) containing products having a boiling point of greater than 340° C., preferably of greater than 370° C. and in a preferred way of greater than 380° C. and resulting from the distillation is at least in part and preferably in its entirety introduced into the second hydrocracking HCK2 stage G of the process according to the invention.

A bleeding can advantageously be carried out on the residue liquid fraction, in order to prevent the accumulation of heavy polyaromatic products (HPNAs) present in the loop for recycle of the heavy cuts. This is because the HPNAs are gradually formed during their recycle in the second hydrocracking HCK2 stage, and the recycle of these heavy aromatic components in the loop of the second hydrocracking stage has the consequence of increasing their molecular weight. The presence of the HPNAs in the said recycle loop can eventually result in a certain drop in pressure: A bleeding can thus prove to be useful in order to limit the accumulation of these HPNA products.

In accordance with the invention, the process comprises a stage G of hydrocracking HCK2 the said unconverted liquid fraction resulting from the fractionation stage F, which was optionally bled off. This stage G is carried out in the presence of hydrogen and of a hydrocracking catalyst, preferably at a temperature of between 250 and 480° C., under a pressure of between 2 and 25 MPa, at a space velocity of between 0.1 and 6 $h^{-1}$ and with an amount of hydrogen introduced such that the litre of hydrogen/litre of hydrocarbon ratio by volume is between 100 and 2000 l/l.

Preferably, the hydrocracking stage G according to the invention is carried out at a temperature of between 320 and 450° C., very preferably between 330 and 435° C., under a pressure of between 3 and 20 MPa and very preferably between 9 and 20 MPa, at a space velocity of between 0.2 and 3 $h^{-1}$.

These operating conditions used in stage G of the process according to the invention generally make it possible to obtain conversions per pass, into products having boiling points of less than 340° C., preferably of less than 370° C. and in a preferred way of less than 380° C., of greater than 15% by weight and more preferably still of between 20% and 95% by weight. Nevertheless, the conversion per pass is preferably kept low in order to maximize the selectivity of the process to give products having boiling points of between 150 and 370° C. (middle distillates). The conversion per pass is limited by the use of a high degree of recycle over the second hydrocracking HCK2 stage loop. This degree is defined as the ratio of the feed flow rate of stage G to the flow rate of the feedstock of stage A; preferably, this ratio is between 0.2 and 4, in a preferred way between 0.5 and 2.

In accordance with the invention, the hydrocracking HCK2 stage G is carried out in the presence of at least one hydrocracking catalyst. Preferably, the second-stage hydrocracking catalyst is chosen from conventional hydrocracking catalysts known to a person skilled in the art, already mentioned above relating to the hydrocracking catalyst used in stage D. The hydrocracking catalyst used in the said stage G can be identical to or different from that used in the hydrocracking HCK1 stage D; it is preferably different.

Preferably, the hydrocracking catalyst or catalysts used in stage G comprise an acid function chosen from alumina, silica/alumina and zeolites, preferably chosen from zeolites Y, and preferably chosen from silica/alumina and zeolites.

A preferred catalyst used in stage G comprises and preferably consists of at least one metal from Group VI and/or at least one non-noble metal from Group VIII, a zeolite Y and alumina. An even more preferred catalyst comprises and preferably consists of nickel, molybdenum, a zeolite Y and alumina. Another preferred catalyst comprises, and preferably consists of, nickel, tungsten and alumina or silica/alumina.

In a specific embodiment, at least a part and preferably all of the effluent resulting from the hydrocracking HCK2 stage G can advantageously be sent to a separation stage dedicated to producing a liquid effluent and a gaseous effluent comprising at least hydrogen. In this case, the said second gas/liquid separation stage E is carried out in a high-temperature high-pressure separator operating at a pressure and a temperature compatible with the outlet temperature and pressure of stage G, that is to say preferably at a temperature of between 200 and 390° C., under a pressure of between 2 and 25 MPa. In this case, the liquid effluent resulting from the dedicated separation stage can advantageously be recycled in the hydrocracking stage G.

According to an alternative form, the gaseous effluent comprising at least hydrogen resulting from the second separation stage can advantageously be sent to the compression stage H. In this case, the process employs two gas/liquid separators and a single compressor on the loop for recycle of the hydrogen, and also a single makeup hydrogen compressor, which reduces the cost of the plant.

According to another alternative form, the gaseous effluent comprising at least hydrogen resulting from the dedicated separation stage can be sent to a second dedicated compression stage.

Another subject-matter of the invention is the plant for the implementation of the process described above, in which a hydrotreating HDT reactor in which the hydrotreating stage A is carried out, the separation device S for carrying out stage B and a hydrocracking reactor in which the hydrocracking HCK1 stage C is carried out are positioned in series with regard to their liquid effluents.

Preferably, the plant for the implementation of the process according to one of the preceding claims, in which the internal wall of the chamber of the separation device S, in order to carry out stage B, is provided with a plurality of openings, which are optionally equipped with nonreturn valves, or in which the said internal wall operates by overflowing with its upper edge is in the form of chevrons.

Optionally the separation device S of the plant comprises a scrubbing compartment c which is provided with a tray for distributing the scrubbing fluid and optionally with a draw-off tray.

Let us now go into the more detailed description of the separation device S used in the separation S2 stage E: this device for separation of liquid and gas from a fluid combining a liquid phase and a gas phase is such that:

the said device comprises a single chamber delimited by external walls and comprising an external inlet for fluid, an external liquid outlet and an external gas outlet, the chamber being oriented along a substantially vertical or oblique axis and being compartmentalized into at least two compartments using at least one wall internal to the chamber and oriented substantially along the said axis, the compartments comprise an upstream degassing compartment and a downstream stripping compartment, the upstream degassing compartment is in fluidic connection with, on the one hand, the external inlet for fluid to be separated and with, on the other hand, a first gas outlet and a degassed liquid outlet, the stripping compartment is in fluidic connection with an inlet for the said degassed liquid, a stripping medium inlet, a second gas outlet and a liquid outlet, the first and second gas outlets are in fluidic connection with the external gas outlet of the chamber, the liquid outlet of the stripping compartment is in fluidic connection with the external liquid outlet of the chamber, the passage of the degassed liquid from the outlet of the degassing compartment to the inlet of the stripping compartment is provided by at least one opening made in the internal wall and/or by overflowing above the said internal wall separating the said compartments.

The terms "upstream" and "downstream" relate to the general flow of the fluid to be separated in the chamber. The term of "compartment" is to be understood as a zone in the chamber delimited at least partially by at least one internal wall, in particular lateral internal wall. The term of "section" can also be used in the present text with the same meaning.

In the invention, recourse is thus had to a separation device for stage E with a single chamber, in order to favour the compactness of the device in its entirety.

The separation device of the invention uses two sections at least, including a first degassing section, where the fluid to be separated will approach its thermodynamic equilibrium, in particular in terms of temperature, with a first part of the gas present in the fluid which separates naturally from the fluid without mechanical or other action, except for appropriately adjusting the dimensioning of this section as a function of certain parameters related to the physicochemical characteristics of the fluid and to its flow rate. It can be a matter of the dimensioning of the section for passage of the fluid, of the surface area for passage of the gas extracted from the fluid, also according to the time for passage of the fluid in this section targeted in this section in order to achieve the desired level of degassing.

The separation device subsequently uses a stripping section, which operation consists in treating the degassed fluid for the purpose of evaporating as much as possible of the remaining gaseous compounds, which are dissolved in the liquid phase of the fluid. The treatment consists in injecting a stripping medium, namely a gas, such as hydrogen, water in the vapour form or nitrogen, an injection of gas which makes it possible to lower the partial pressure of the gases to be separated and thus to evaporate them. Here again, it is possible to adjust the effectiveness of the separation obtained in this section by choosing an appropriate dimensioning, in particular an appropriate surface area for passage of the gases which will also define the residence time of the fluid in this section.

These two successive operations, by themselves alone, make it possible to obtain a very efficient separation of the fluid to be treated. Moreover, the delimitation of the compartments in which these operations are carried out, by addition of internal wall(s) in the chamber of the separator, is simple to carry out and in particular makes it possible to render the separator flexible by adapting the shape, the dimensioning and the position of the or of these walls as a function of the characteristics of the fluid to be treated. This wall can in particular be adapted in order to adjust the transfer of the degassed fluid from the degassing compartment to the stripping compartment:

it will be possible, in particular, to adjust its relative height with respect to that of the chamber and with respect to the level of fluid expected in the chamber if a transfer by overflowing is chosen, it will be possible, likewise, to choose the shape of the opening in the wall and/or the size and/or the number and the position of the orifices, their distribution, their level over the height of the wall with respect to the level of fluid expected also, if the entry of the liquid into the stripping compartment takes place through the wall via one or more orifices.

This direct transfer from one compartment to the other, from one operation to the other, is highly advantageous, in particular in terms of limitation of the residence time of the fluid (better yield), in terms of limitation of drop in pressure, and the like.

According to one embodiment, this internal wall is provided with a plurality of openings, optionally equipped with nonreturn valves. The presence of these valves guarantees an absence of reflux of the liquid from the stripping compartment to the degassing compartment.

According to another embodiment, this internal wall operates by overflowing and its upper edge is in the form of chevrons, which improves the stabilization and the homogenization of the liquid flow from the degassing compartment to the stripping compartment.

According to an alternative form of the invention, the external walls of the chamber comprise side walls, a bottom wall and an upper wall, the internal wall being flat and connecting together two zones of the external side walls of the chamber, the upstream degassing compartment and the downstream stripping compartment each being delimited laterally, on the one hand, by the said internal wall and, on the other hand, by a portion of external side walls on either side of the said internal wall.

According to another alternative form, the internal wall delimits, by itself alone, one of the compartments by being closed laterally, and is in particular positioned concentrically around the axis of the chamber. In this scenario, preferably, the chamber has essentially cylindrical external side walls, and the internal wall is concentric with the said cylindrical walls, with the upstream degassing compartment positioned the most externally and of annual shape, and the downstream stripping compartment positioned inside the internal wall, or vice versa.

According to a specific configuration of this other alternative form, the internal wall is extended in the lower part towards the external side walls of the chamber by a solid tray, the said wall acting as weir. The external fluid inlet is positioned above the tray, the degassing compartment being delimited by the internal wall and the external wall of the chamber laterally and by the tray in the lower part, the stripping compartment being delimited by the internal portion of the internal wall and the zone of the chamber located under the solid tray of the degassing compartment. Unlike the preceding configurations, in this case, the two compartments are substantially superimposed on one another and not placed side by side laterally to one another.

According to a preferred optional embodiment, the chamber according to the invention comprises a third "scrubbing" compartment, downstream of the two first compartments, and positioned above them in the chamber. This scrubbing compartment is advantageously provided, on the one hand, with an external inlet for scrubbing fluid, with a first gas inlet in fluidic connection with the first gas outlet of the first degassing compartment and with a second gas inlet in fluidic connection with the second gas outlet originating from the second stripping compartment and, on the other hand, with a liquid outlet in fluidic connection with the second stripping compartment and with a gas outlet in fluidic connection with the external gas outlet of the chamber.

The scrubbing fluid can be composed of hydrocarbons: preferably, a light or heavier cut petrol (LVGO, HVGO), or also a deasphalted oil or a middle distillates cut (gas oil or kerosene), a naphtha or an aromatic oil resulting from a catalytic cracking is chosen. This fluid can moreover result from the plant where the separation device according to the invention is positioned; for example, it can result from a vacuum distillation operation in a hydrocracking process or be an external feedstock, which will subsequently be treated in a reactor positioned downstream of the separation device of the invention.

In this scrubbing compartment, there is preferably a countercurrentwise contact between a downward liquid phase and an essentially gaseous upward phase. Preferably, the scrubbing compartment comprises a tray for distributing the scrubbing fluid and optionally a draw-off tray.

In the case where a scrubbing compartment is provided, provision is advantageously made for the internal wall, oriented substantially vertically, to be surmounted, directly above its upper edge, with an inclined tray joining the external side wall of the chamber so as to cover the first degassing compartment positioned between the internal wall and the external side wall and to direct the liquid exiting from the liquid outlet of the scrubbing compartment directly above the said first degassing compartment to an inlet of the second stripping compartment. Thus, in this configuration, liquid originating from the scrubbing compartment is prevented from returning to the degassing compartment.

Still in the case where a scrubbing compartment is provided, in the configuration where the internal wall delimits, by itself alone, the first degassing compartment, the said wall is advantageously surmounted, above its upper edge, with a sloping roof, so as to cover the first degassing compartment and to direct the liquid exiting from the liquid outlet of the scrubbing compartment directly above the said first compartment to an inlet of the second stripping compartment positioned between the said internal wall and the external side wall of the chamber. Here again, in the case where the degassing compartment occurs "in the middle" of the chamber, this roof prevents any liquid originating from the scrubbing compartment from returning to the degassing compartment.

Thus, generally, whatever the relative configuration of the degassing compartment and stripping compartment, the scrubbing compartment is found above them, and it is wise to provide any deflecting means for preventing or limiting the return of liquid from the scrubbing compartment to the degassing compartment.

Another subject-matter of the invention is any process for employing the separation device described above, and such that the following successive stages are carried out:
 a stage of degassing the fluid to be separated into a liquid phase and into a gas phase by getting the fluid closer to its thermodynamic equilibrium in the first degassing compartment,
 a stage of stripping by injection of a stripping medium in order to evaporate a part at least of the light components dissolved in the liquid obtained by the degassing stage in the stripping compartment,
 optionally a stage of scrubbing by injection of a scrubbing medium in order to condense the heavy compounds resulting from the degassing and/or stripping stage in the scrubbing compartment.

Advantageously, it is possible, by this process, to separate, into a liquid phase and into a gas phase, a fluid exhibiting a ratio of gas to liquid flow rates by weight G/L of between 0.1 and 10 and preferably between 0.5 and 2. This process thus applies to a very wide range of fluids.

Advantageously, the temperature of the fluid to be separated by this process can be between 20 and 600° C. and preferably between 150 and 450° C. The process thus applies equally well to temperatures close to ambient temperature and to high temperatures.

Advantageously, the pressure of the fluid to be separated by this process can be between 0.1 and 25 MPa, in particular between 15 and 20 MPa. Here again, the process thus applies equally well to relatively low pressures of fluids and to very high pressures.

Advantageously, the passage time of the fluid in the degassing compartment and/or in the stripping compartment is between 30 seconds and 10 minutes, which renders the total residence time of the fluid in the compartment reasonable on the industrial scale.

Preferably, the section for passage of the fluid in the degassing compartment and/or in the stripping compartment, and/or in the scrubbing compartment, when it is present, is chosen to be sufficient to limit the velocity of the gas below the critical velocity for entrainment of the droplets, preferably below 90% or below 80% of the said critical velocity.

It should be remembered that the critical velocity cv can be calculated, in a known way, using the following formula, with dl the density of the liquid phase and dg the density of the gas phase of the fluid:

$$v_c = 0.48 \times \sqrt{\frac{d_L}{d_G} - 1}$$

BRIEF DESCRIPTION OF THE DRAWINGS

The invention will be described in more detail below using nonlimiting examples, illustrated by the following figures.

The figures are schematic and the different elements represented are not necessarily to scale. The separation device according to the invention, also denoted under the term of separator, defines a chamber, the greatest dimension of which is positioned along a vertical axis X in its operating position, and it is thus that it is represented in the figures. The identical components exhibiting the same meaning retain the same reference from one figure to the other.

In a first step, FIGS. 1 to 7, centred on the separation device used in stage E of the two-stage hydrocracking process of the invention, are described.

Figure 1:
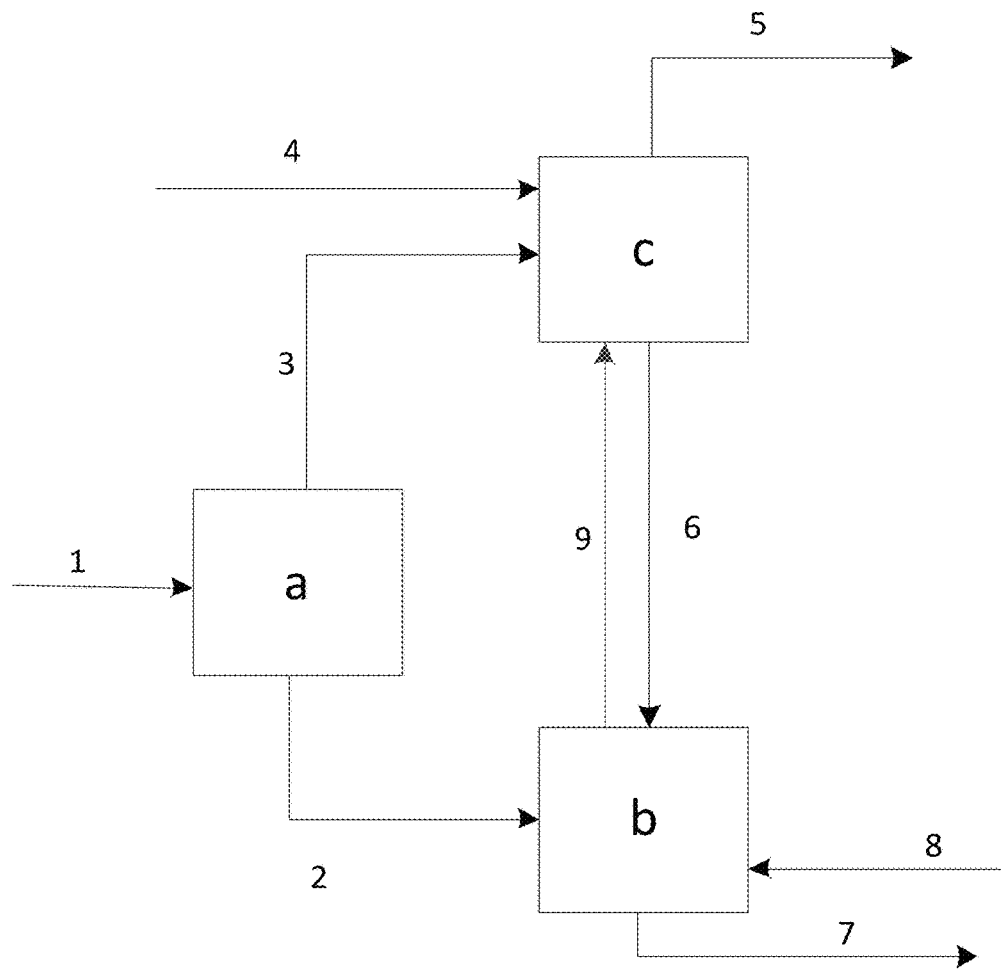
FIG. 1: a functional representation of the operating principle of the separation device according to a first example according to the invention.

FIG. 1 is thus a functional representation of the gas/liquid separation carried out by the separator according to the invention. Let us take the example of a fluid in the form of a two-phase liquid/vapour stream, the ratio of the gas to liquid flow rates by weight G/L of which is between 0.1 and 2 and preferably between 0.5 and 2. The temperature of the stream to be separated is between 20° C. and 600° C., preferably between 150 and 450° C. The pressure of the stream to be separated is between 0.1 and 25 MPa and preferably between 15 and 20 MPa. The stream to be separated is, for example, the effluent from a fixed-bed hydrotreating reactor or the effluent from a fixed-bed hydrocracking reactor.

The separation according to the invention is carried out in three sections (also known as compartments in the description which follows of the different alternative separator forms): a degassing section a, a stripping section b and an optional scrubbing section c. These two or three sections are, according to the invention, integrated in one and the same separator, thus in a single chamber.

The entire separator operates at the same pressure or substantially at the same pressure as that of the incoming two-phase stream 1 to be separated.

The stream to be separated 1 is injected into the degassing section a. The aim of this operation is to carry out a first separation, by allowing the fluid to reach or to approach its thermodynamic equilibrium, in temperature and in pressure. It is then possible to withdraw, from section a, a predominantly liquid stream 2, referred to as degassed liquid, and a predominantly gaseous stream 3.

In order to ensure that this first separation is carried out efficiently, the degassing section a is dimensioned so as to limit the entrainment of liquid droplets in the stream 3: the surface area for passage of the gas stream 3 in section a is chosen to be sufficient to limit the velocity of the gas below the critical velocity for entrainment of the droplets, preferably below 90% of this velocity, more preferably still below 80% of this critical velocity. The critical velocity is defined as the velocity of fall of droplets with a diameter of 100 micrometres in the gas stream at the operating conditions of section a.

It varies as a function of the properties of the gas and of the liquid of the stream to be treated, and also of the operating conditions (flow rate, temperature, pressure, and the like). The passage time of the stream 1 in section a is generally between 30 seconds and 10 minutes; this is a time sufficient for the stream to stabilize thermodynamically and for the degassing to take place, with an upper part containing predominantly gas with a small amount of liquid and, in the lower part, predominantly a liquid, still containing a certain portion of gas, and an interface between these two parts.

In section a, there is thus a lower zone in which, in operation, a continuous liquid phase is found and an upper zone in which a continuous gas phase is found. These two phases are delimited with respect to one another by an interface, which will define the level of liquid in this section. The predominantly liquid stream 2 exiting from section a is subsequently injected into the stripping section b. The objective of this operation is to evaporate a part of the light/gaseous components in the degassed liquid 2. In order to carry out the stripping, a stream 8 of a stripping medium will be injected into section b, this medium being in this instance hydrogen: the injection of hydrogen makes it possible to lower the partial pressure of the gases (hydrocarbons) to be separated and to evaporate them. Section b can optionally be provided with chevrons or trays (such as shower decks, discs and doughnuts, bubble cap trays, valve trays or any other distillation tray technology known to a person skilled in the art).

Other gases than hydrogen can alternatively be chosen as stripping medium, such as, for example, a light gas, such as steam or nitrogen.

The surface area for passage of the gas in section b is sufficient to limit the velocity of the gas below the critical velocity for entrainment of the droplets, preferably below 90% of this velocity, more preferably still below 80% of this critical velocity. The passage time of the liquid in section b is between 30 seconds and 10 minutes.

In section b, in operation, there will also be a lower zone in which a continuous liquid phase is found and an upper zone in which a continuous gas phase is found, the two upper and lower zones being delimited with respect to one another by an interface defining the level of liquid in the stripping section b.

The gas stream 3 resulting from section a is injected, with the gas stream 9 resulting from section b, into the scrubbing section c. This scrubbing stage is optional. It makes it possible to reduce the amount of heavy compounds entrained in the gas stream 5 which exits from the separator. The objective of this stage is to condense the heavy compounds resulting from section a and, to a lesser extent, from section b. This stage also makes it possible to recover the droplets of liquids entrained from these sections. A stream 4 of a scrubbing medium is injected into section c in order to absorb these heavy compounds. This scrubbing medium can be composed of hydrocarbons. Preferably, this stream is a light or heavy vacuum gas oil (LVGO or HVGO), a deasphalted oil (DAO) or a middle distillates cut (gas oil or kerosene), a naphtha or an aromatic oil resulting from a catalytic cracking (LCO/HCO). The scrubbing stream can result from the process where the separator is installed or be imported, for example resulting from a vacuum distillation installed in the hydrocracking process concerned. It can also be an external feedstock which is subsequently treated in reactors installed downstream of the separator, on its gas outlet or on its liquid outlet.

In this scrubbing section c, there is a countercurrentwise contact between a downward liquid phase and an essentially gaseous upward phase, according to a technology known to a person skilled in the art.

Section c is preferably provided with a structured or random packing, preferably a structured packing, maximizing the liquid/vapour exchanges. Section c can also be composed of chevrons or trays (such as shower decks, discs and doughnuts, valve trays or any other distillation tray technology known to a person skilled in the art).

It should be noted that, while section b and section c can both be provided with packings, also known as internal packings, such as those mentioned above, they remain distinct from one another, the inlet/outlet streams which pass through them being different: the stream which passes through section c is predominately, in particular essentially, gaseous, which contains liquid dispersed within it, whereas section b is traversed by a predominantly, in particular essentially, liquid stream with gas dispersed within it.

The surface area for passage of the gas resulting from section c is sufficient to limit the velocity of the gas below the critical velocity for entrainment of the droplets, preferably below 90% of this velocity, more preferably still below 80% of this critical velocity.

Optionally, a coalescer pad (or mesh pad) is installed in the upper part of section c, so as to coalesce the entrained droplets, in order to increase the diameter of these droplets and to limit the entrainment thereof in the gas.

The flow over the packings is of trickling type (the continuous phase is in this instance the gas phase).

In the case where the scrubbing medium is liquid under the operating conditions, the scrubbing oil absorbs a part of the hydrocarbons resulting from sections a and c and makes it possible to prevent the export of droplets in the gas stream 5 exiting from the separator. This makes it possible to increase the velocity of the gases in section a and thus to limit the surface area thereof for passage. Limiting the export of droplets in the gas stream 5 is advantageous for the items of equipment positioned downstream of the separator as this limits the fluctuations in composition and optionally the fouling of these items of equipment.

In the case where the scrubbing medium is partially or completely evaporated in section c, its evaporation makes it possible to accentuate the phenomenon of condensation of the heaviest vapours resulting from sections a and b. In this case, the medium can advantageously be treated in a reactor installed downstream of the gas outlet 5 of the separator (for example a reactor for the hydrodesulfurization of middle distillates).

The temperature of the scrubbing medium stream 4 is preferably less than the temperature of the stream 1 entering the degassing section a, in order to maximize the phenomenon of condensation of the heavy vapours and to thus limit the flow rate thereof. The temperature of the stream 4 can be controlled by a heat exchanger upstream of the injection into the separator.

The temperature of the stream 1 is advantageously between 20 and 600° C. and preferably between 150 and 450° C. The temperature of the stream 4 is advantageously also between 20 and 600° C., thus the same range as for the stream 1. However, preferably, the temperature of the stream 4 is chosen 50° C. colder than the temperature of the stream 1 and more preferably still 100° C. colder than the temperature of the stream 1.

The flow rate of the stream 4 is chosen to be sufficient to obtain a wetting of the packing or of the trays used in section c.

The liquid stream 6 resulting from the scrubbing section c is also injected into the stripping section b. This stream is composed of the compounds condensed in section c and of the non-evaporated scrubbing medium of the stream 4.

A stripping medium can optionally be injected also into the degassing section a.

The temperature of the stripping section b is the thermodynamic equilibrium temperature of the mixture of the streams 2, 6 and 8; it is generally less than the temperature of the degassing section a by a few degrees.

In synthesis, the different stream exchanges/transfers in the three sections of the separator S are thus the following:
the fluid to be separated 1 enters, from the outside of the separator, the degassing section a
a degassed liquid 2 exits from section a to the stripping section b
a gas 3 exits from section a, which gas goes to the scrubbing section c
the degassed liquid 2 enters the stripping section b
a stripping medium 8 enters the stripping section b
a gas 9 exits from the stripping section to the scrubbing section c and a liquid 7 exits from the stripping section to the outside of the separator
the gas 3 originating from the degassing section a, the gas 9 originating from the stripping section b and the scrubbing medium 4 enter the scrubbing section
a liquid stream 6 exits from the scrubbing section c to the stripping section b and a gas stream 5 exits from the scrubbing section c to the outside of the separator.

Overall, there is thus a two-phase liquid/gas stream 1 entering the separator via the degassing section a, a liquid stream 7 exiting via the stripping section b and a gas stream 5 exiting via the scrubbing section c.

The different alternative separator design forms employing this separation process are described below one by one. In all the alternative forms represented in FIGS. 2 to 6, the separator S exhibits a single chamber with substantially cylindrical side walls, with a bottom wall and an upper wall both slightly rounded/convex, which can thus exhibit a hemispherical or hemi-elliptical shape. This shape means that this type of chamber can also be denoted under the term of knockout "drum". The separator, in the operating position, is oriented along the X axis of the cylindrical walls, in this instance a vertical axis. Naturally, the invention applies in the same way to separators, the section of which is not cylindrical or which is oriented obliquely with respect to the vertical, and also to separators, the bottom wall and/or the upper wall of which are not rounded but flat, for example.

Figure 2B:
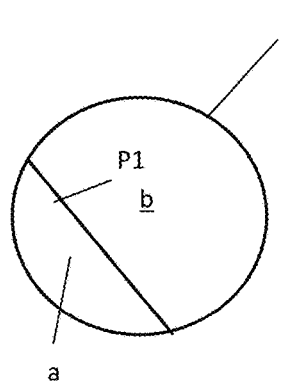
FIGS. 2a, 2b: a first alternative form of the separation device according to the invention, respectively along a vertical section and a horizontal section at mid-height, according to the first example according to the invention.
Figure 2A:
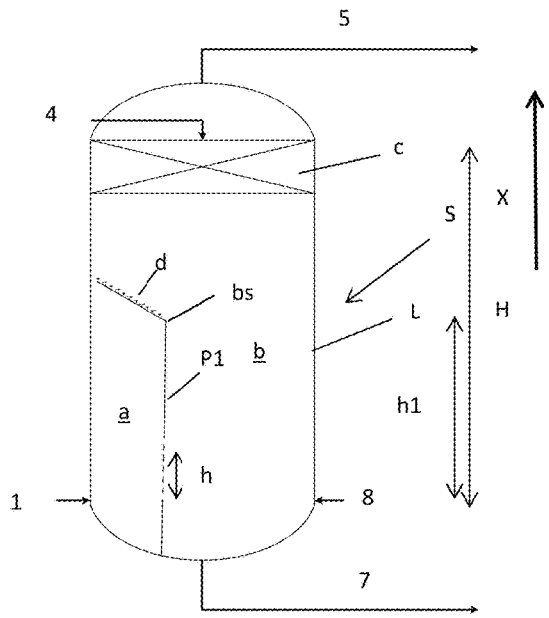
Figure 6:
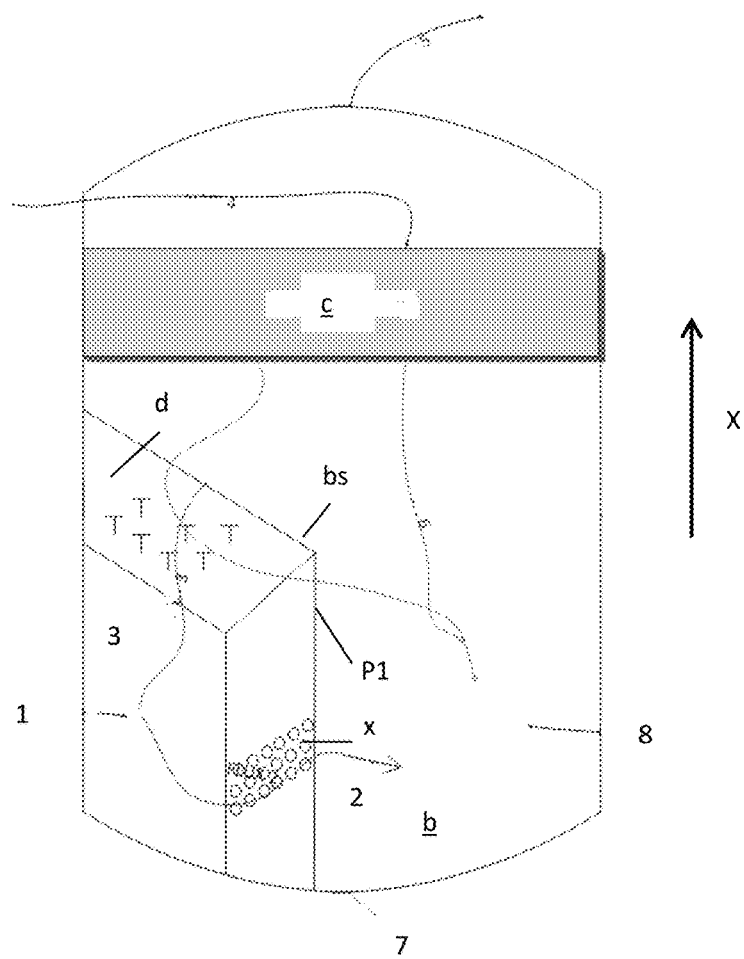
FIG. 6: the first alternative form of FIGS. 2a, 2b according to a bird's-eye view with the representation of the liquid streams in the device; according to the first example according to the invention.

According to FIGS. 2a and 2b and 6, a first alternative form of separator S is represented with thus its cylindrical side walls L. An internal wall P1 is positioned inside the chamber: it is a flat and vertically oriented wall. In the lower part, it rests on the bottom wall of the chamber, and its upper edge bs corresponds approximately to between half and ⅔ of the height H of the cylindrical side walls L of the chamber. This wall P1 joins, by its two side edges, the side wall of the chamber, and thus defines two coaxial compartments: the degassing compartment a and the stripping compartment b. The compartment a is provided with the inlet 1 for the fluid to be separated.

In the upper part, above the upper edge bs of the internal wall P1, there is found the scrubbing compartment c, as represented in FIG. 6.

The wall P1, as also represented in FIG. 6, is provided with through orifices x distributed over a strip of height h: the position, the size and the distribution of these orifices are chosen so as to allow the degassed liquid 2 to pass from compartment a to compartment b, while keeping the fluid 1 in the degassing compartment for a sufficient residence time. The surface area for liquid passage of the combined orifices x is such that the liquid stream 2 which passes through them is at least equal to the liquid stream coming from the stream 1. Optionally, the orifices x, or at least some of them, are provided with nonreturn valves (not represented) in order to minimize the recirculation of liquid from compartment b to compartment a.

Alternatively, a solid wall P1 is retained and the degassed liquid 2 is transferred from compartment a to compartment b by overflowing of the liquid above the upper edge bs of the internal wall P1, which forms a weir. In this case, the residence time of the fluid in the compartment is a function, in particular, of the height h1 of the upper edge bs in question and, preferably, this upper edge, acting as weir, is equipped with chevrons, so as to stabilize and to homogenize the flow of liquid from compartment a to compartment b.

The upper edge bs of the internal wall P1 is surmounted by a wall d, represented in FIG. 6, which is a wall positioned above the upper edge bs as far as the side walls L of the chamber. It is preferably without contact with the upper edge, for mechanical reasons, but it is also possible to provide a continuity between the upper edge bs and this wall d. This wall d is oriented obliquely towards the centre of the chamber in the form of an inclined tray which separates compartment a from the scrubbing compartment c. This inclined tray is optionally provided with valves and/or with bubble caps in order to allow the gas resulting from compartment a to pass to compartment c but while preventing the passage of liquid from compartment c to compartment a. Preferably, the inclined tray d is not in contact with the internal separation wall P1 between a and b. The angle of inclination of the tray d with respect to the horizontal is between 1° and 45°, preferably between 5° and 30°. In this instance, by way of example, it is approximately 20°.

The surface area for passage of the gas resulting from compartment a to compartment c via the stream 3 is chosen to be sufficient to limit the velocity of the gas below the critical velocity for entrainment of the droplets, preferably below 90% of this velocity, more preferably still below 80% of this critical velocity.

The passage time of the liquid in the stripping compartment b is between 30 seconds and 10 minutes. The stripping medium (stream 8) is injected into compartment b through a diffuser. The liquid draw-off orifice (stream 7) of the stripping compartment b is preferably provided with a conventional anti-vortex device, in order to limit the entrainment of gas in the pipe evacuating the liquid from the compartment. It can be a matter, for example, of crossbraces.

When the scrubbing compartment c exists, as is the case represented in FIGS. 2 and 6, then the scrubbing oil is injected into compartment c via a distribution tray (not represented) which provides a homogeneous distribution over the internal parts of compartment c, which is preferably provided with a structured or random packing, preferably a structured packing, maximizing the liquid/vapour exchanges.

Compartment c can also comprise chevrons or trays, such as shower decks, discs and doughnuts, valve trays or any other conventional distillation tray technology.

The surface area for passage of the gas (stream 5) resulting from compartment c is chosen to be sufficient to limit the velocity of the gas below the critical velocity for entrainment of the droplets, preferably below 90% of this velocity, more preferably still below 80% of this critical velocity.

Figure 3B:
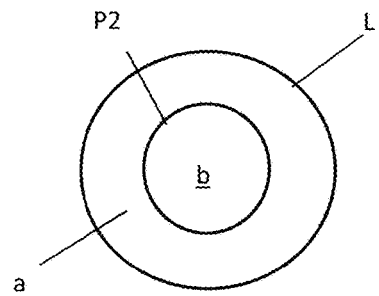
FIGS. 3a, 3b: a second alternative form of the separation device according to the invention, respectively along a vertical section and a horizontal section at mid-height, according to the first example according to the invention.
Figure 3A:
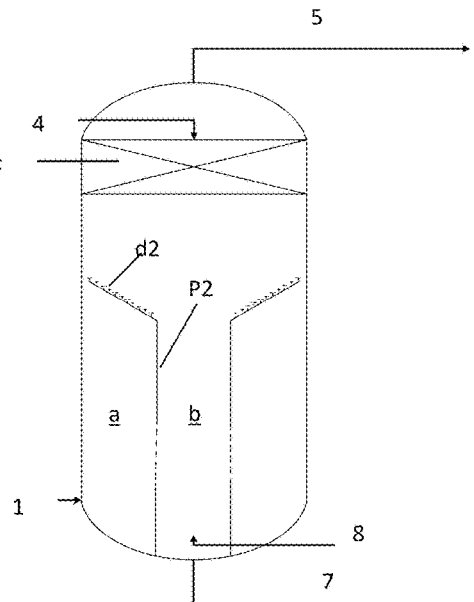

FIGS. 3a and 3b describe a second alternative form of separator S. Only that which differs from the first alternative form described above will be described. The main difference is the modification in the relative configuration between compartments a and b: in this instance, they are positioned concentrically with the vertical axis of the separator, by an internal wall P2 which defines a cylinder positioned on the bottom wall of the separator and centred on the vertical axis of the latter: there is thus a degassing compartment a on the outside with respect to the vertical axis of the separator, of substantially annular shape and delimited by this wall P2, on the one hand, and by the external side walls L of the separator, on the other hand, and compartment b, which is delimited by the interior space defined by the cylindrical internal wall P2. The inclined wall d2 separating compartment a from compartment c is this time substantially in the form of a frustum, the smaller base of which surmounts the cylindrical upper edge, with or without continuity, of the wall P2 and the greater base of which joins the external side walls L of the separator.

Figure 4B:
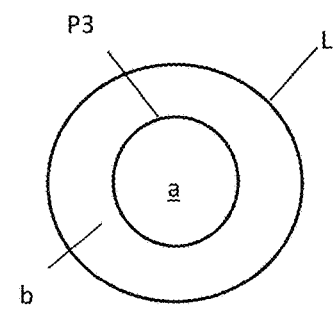
FIGS. 4a, 4b: a third alternative form of the separation device according to the invention, respectively along a vertical section and a horizontal section at mid-height, according to the first example according to the invention.
Figure 4A:
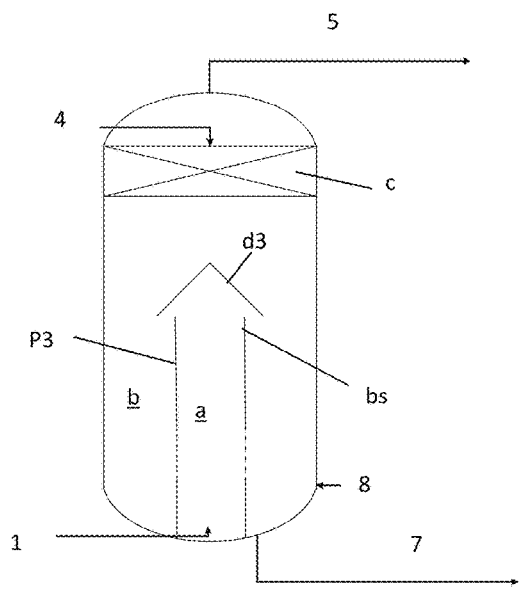

FIGS. 4a and 4b describe a third alternative form of separator S. For this alternative form, only that which differs from the second alternative form described above will be described. In this alternative form, the two compartments a and b are positioned concentrically as in the second alternative form but this time it is compartment b which is of annular shape and which is positioned on the outside and compartment a which is delimited by the cylindrical interior space delimited by the internal wall P3. The inclined wall d3 separating compartment a from the upper scrubbing compartment c this time exhibits the shape of a conical roof which will surmount, at a certain distance, the upper edge bs of the wall P3 while exhibiting, at its base, a diameter slightly greater than that of the wall P3. The gas (stream 3) can thus circulate as represented from compartment a to compartment c while flowing upward between the upper edge of the wall P3 and the base of the roof d3.

Figure 5:
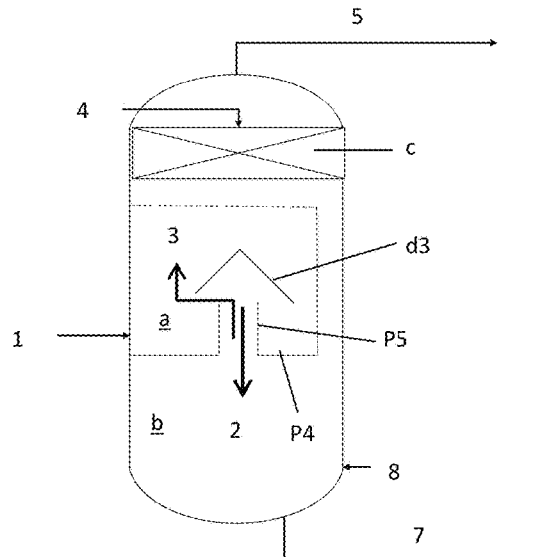
FIG. 5: a fourth alternative form of the separation device according to the invention along a vertical section, according to the first example according to the invention.

FIG. 5 is a fourth alternative form of separator S, where the separation between compartments a and b is carried out using a solid tray P4 positioned substantially horizontally in the chamber and of annular shape and solid form, and provided with a weir consisting of the circular central opening of the solid tray extending upward in a portion of solid cylindrical wall P5 over a given height. The injection of the stream 1 of fluid to be treated is carried out above the tray P4. In the top part of the weir P5, above its upper edge, there is positioned a conical roof d3 of the same design as that used in the preceding alternative form.

The degassing compartment a is the zone located above the tray P4 up to the height of the upper edge of the weir P5. Compartment b is the zone which comprises the internal space delimited by the wall P5 of the weir and the space which occurs under the tray P4. The scrubbing compartment c is above the combination, as in the preceding alternative forms.

The fluid passes from compartment a to compartment b (stream 2) by overflowing above the upper edge of the weir P5: the residence time of the fluid in the degassing compartment a is a function of the height of the weir.

The surface areas for passage of the gas from compartment a and from compartment b, and the passage time of the liquid in compartments a and b, are chosen as above.

The crest of the weir P4 is preferably in the form of chevrons in order to stabilize and homogenize the flow of liquid resulting from compartment a.

Figure 7:
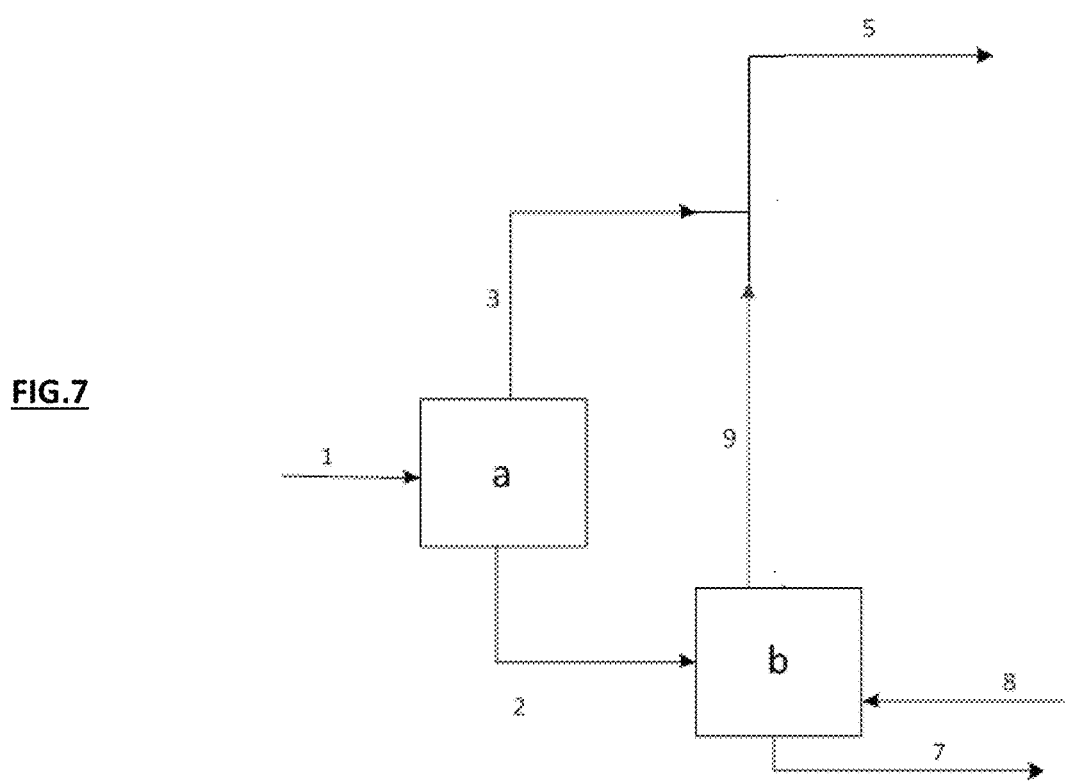
FIG. 7: a functional representation of the operating principle of the separation device according to a second example according to the invention.

FIG. 7 represents a functional representation of the operating principle of the separation device according to a second implementational example according to the invention: in this instance, there is no longer a scrubbing section c, and only the sections/compartments a and b: the gas streams 3 and 9 meet to form an outlet gas stream 5 and there is no longer a stream 6 from the scrubbing section c up to the stripping section b. This second example makes it possible to have a simpler design for the device and also gives very good results; even if the improvement may be lower than that introduced by the first implementational example of the invention, it remains significant.

To summarize for all of these alternative forms relating to the separation device, of numerous variables, besides the choice of the sections for passage of gas and of liquid from one compartment to another, there are a certain number of other parameters which it is possible to vary in order to adjust the quality of the separation obtained: it may be a matter, in particular, of the flow rate of stripping medium injected into compartment b, or also of the choice of the temperature of the stream of the scrubbing fluid 4 in compartment c (in order to limit/control the entrainment of heavy products in the external outlet gas stream 5).

Figure 8:
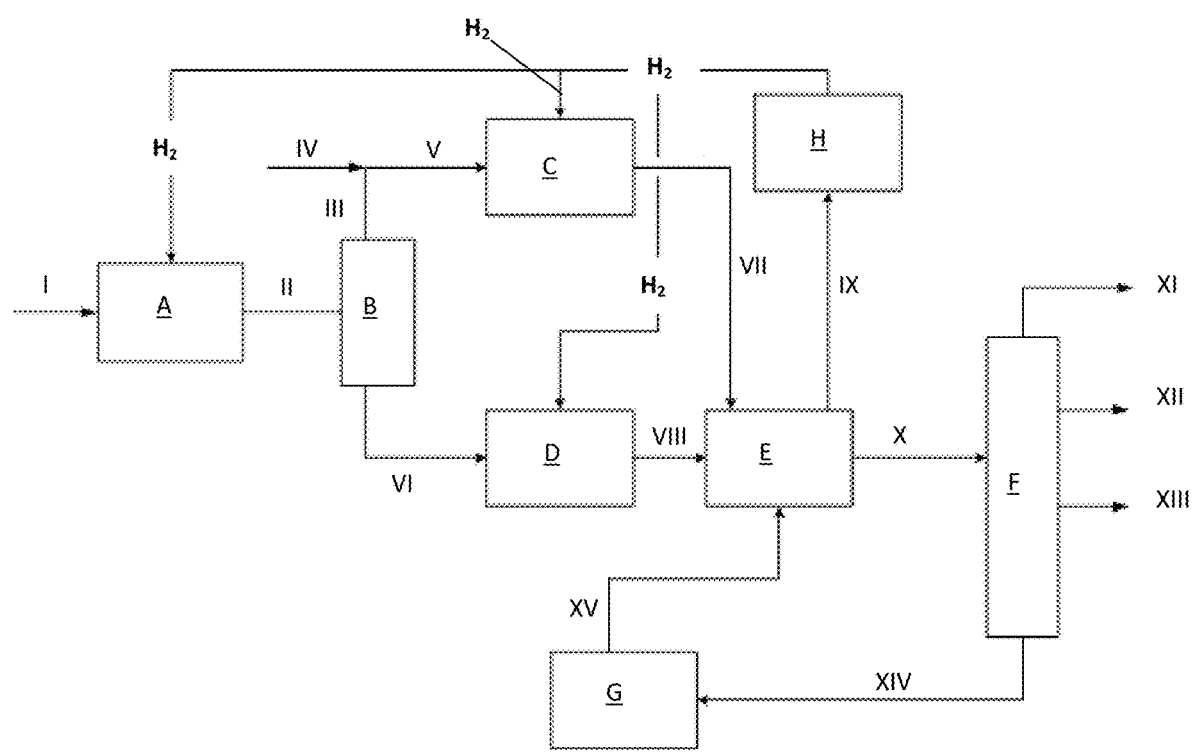
FIG. 8: a functional representation of a hydrocracking process integrating the separation device of the preceding figures.

In a second step, FIG. 8, which functionally represents an embodiment of the two-stage hydrocracking process integrating the separation device S described with the preceding FIGS. 1 to 7, is described:
 the feedstock is sent to the hydrotreating stage A: stream I
 the feedstock obtained at the end of stage A is sent to the liquid/solid separation S1 stage B, for example with the separator according to the alternative form illustrated in FIGS. 3a-3b: stream II
 the gas fraction, containing middle distillates MDs and hydrogen, obtained by the separation carried out in stage B is sent to the hydrodesulfurization stage C: stream III, with an external feedstock of gas oil type: stream IV, to form a stream V
 the liquid fraction, obtained by the separation carried out in stage B, is sent to the hydrocracking HCK1 stage D: stream VI, with a supply of hydrogen: $H_2$ stream
 at the outlet of the hydrocracking stage D, the liquid effluent is sent to the separation S2 stage E: stream VIII
 at the outlet of the separation stage E, the liquid effluent is sent to the fractionation stage F: stream X
 at the outlet of the fractionation stage F, a cut of light products: stream XI, a petrol cut: stream XII, a cut of middle distillates MDs: stream XIII, and an unconverted liquid fraction UCO: stream XIV, are obtained
 the UCO fraction obtained in the fractionation stage F is sent to the hydrocracking HCK2 stage G: stream XIV
 the effluent (liquid/gas mixture) exiting from the hydrocracking HCK2 stage G is sent to the separation S2 stage E: stream XV
 the gaseous effluent obtained during the separation S2 stage E is sent to the compression stage H; it comprises hydrogen: stream IX
 the effluent (liquid/gas mixture) obtained at the outlet of the hydrodesulfurization stage C is sent to the separation S2 stage E: stream VII
 the hydrogen resulting from the compression stage H is returned at the inlet of the hydrotreating stage A, and/or of hydrodesulfurization stage C and/or of hydrocracking HCK1 stage D: $H_2$ stream—one at least of these streams can also be replaced, in all or part, with an external supply stream of hydrogen.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 18/53.743, filed Apr. 27, 2019, are incorporated by reference herein.

EXAMPLES

The following examples illustrate the invention without limiting scope thereof.

Example 1 (Comparative)

This example is a comparative example, in which the reactions for the hydrocracking of VDs or VGOs and for the hydrodesulfurization of gas oils (GOs) are carried out in a single process (cotreatment of the two feedstocks).

The hydrocracking unit treats a vacuum gas oil (VGO) feedstock as a mixture with a gas oil (GO) feedstock described in Table 1:

TABLE 1

| Type | | VGO | GO |
|---|---|---|---|
| Flow rate | t/h | 49 | 51 |
| Density | t/m$^3$ | 0.92 | 0.83 |
| SP TBP | ° C. | 300 | 47 |
| FP TBP | ° C. | 552 | 416 |
| S | wt % | 2.18 | 0.68 |
| N | wtppm | 1800 | 210 |

Main Operating Conditions:

The mixture of the two VGO and GO feedstocks is injected into a preheating stage and then into a hydrotreating reactor R1 under the conditions set out in Table 2:

TABLE 2

| Reactor | | R1 |
|---|---|---|
| Temperature | ° C. | 385 |
| H$_2$ partial pressure | MPa | 14 |
| Catalyst | | NiMo on alumina HR1058 |
| HSV | h$^{-1}$ | 2.60 |

The catalyst used is a NiMo on alumina catalyst of HR1058 type sold by Axens.

The effluent from this reactor is subsequently mixed with a hydrogen stream in order to be cooled and is then injected into a second "hydrocracking" reactor R2 operating under the conditions of Table 3:

TABLE 3

| Reactor | | R2 |
|---|---|---|
| Temperature | ° C. | 390 |
| H$_2$ partial pressure | MPa | 12.5 |
| Catalyst | | Metal on zeolite HYK742 |
| HSV | h$^{-1}$ | 3.8 |

The catalyst used is a catalyst of HYK742 type sold by Axens.

R1 and R2 are the reactors in which the first stage of the hydrocracker is carried out; the effluent from R2 is subsequently sent to a separation stage composed of a chain for recovery of heat and then for high-pressure separation including a recycle compressor and making it possible to separate:

- on the one hand, hydrogen, hydrogen sulfide and ammonia,
- and, on the other hand, the effluent feeding a stripper and then an atmospheric fractionation column in order to separate streams concentrated in $H_2S$, naphtha, kerosene, gas oil at the desired specification, and an unconverted heavy stream.

This unconverted heavy stream is injected into a preheating stage and then into a hydrocracking reactor R3 in which the second hydrocracking stage is carried out. This reactor R3 is employed under the conditions set out in Table 4:

TABLE 4

| Reactor | | R3 |
|---|---|---|
| Temperature | ° C. | 347 |
| $H_2$ partial pressure | MPa | 12.5 |
| Catalyst | | Metal on amorphous silica/alumina HDK766 |
| HSV | $h^{-1}$ | 1.4 |

The catalyst used is a catalyst of HDK766 type sold by Axens.

The effluent from R3 is subsequently injected into the high-pressure separation stage downstream of the first hydrocracking stage and recycled. The flow rate by weight at the inlet of R3 is equal to the flow rate by weight of the VGO feedstock; a bleed corresponding to 2% by weight of the flow rate of the VGO feedstock is taken at the fractionation bottom on the unconverted oil stream.

The distillate cut produced in the hydrocracker and recovered from the fractionation column is in accordance with the Euro V specifications; in particular, it has less than 10 ppm by weight of sulfur.

The yield of middle distillates of this process is 80% by weight, for an overall conversion of 98% by weight of the hydrocarbons having a boiling point of greater than 380° C.

The total volume of catalyst necessary for this process is 112 m$^3$.

Example 2 (Comparative)

This example is a process in accordance with the invention, except in one point: a simple separator (hot drum without injection of stripping gas or of scrubbing oil) is installed in order to carry out stage B, downstream of the first hydrotreating stage A, in place of the separator device S of the invention.

The feedstock I of the hydrotreating reactor R1 is a VGO identical to that treated in Example 1. The VGO feedstock is mixed with a hydrogen stream (1000 Sm$^3$/Sm$^3$ of VGO), then injected into a preheating stage and then into the hydrotreating reactor R1 (stage A) under the conditions set out in Table 5:

TABLE 5

| Reactor | | R1 in stage A |
|---|---|---|
| Temperature | ° C. | 385 |
| $H_2$ partial pressure | MPa | 13 |

TABLE 5-continued

| Reactor | | R1 in stage A |
|---|---|---|
| Catalyst | | CoMo on alumina HR1058 |
| HSV | $h^{-1}$ | 1.67 |

The catalyst used is a NiMo on alumina catalyst of HR1058 type sold by Axens.

The effluent II from the hydrotreating reactor A is injected into a simple knockout drum (stage B). The operating conditions and degrees of recovery of this separator are given in Table 6:

TABLE 6

| Temperature | ° C. | 350 |
|---|---|---|
| Pressure | MPa | 14 |
| Middle distillates recovered at the bottom | t/h | 10 |
| $H_2S$ + $NH_3$ at the bottom | t/h | 1.5 |

The vapour effluent III resulting from the separator in stage B is subsequently mixed with an external GO feedstock IV identical to that treated in Example 1. The hydrotreated mixture V is sent (stage C) to a hydrodesulfurization reactor R4 operating under the conditions given in Table 7:

TABLE 7

| Reactor | | R4 in stage C |
|---|---|---|
| Temperature | ° C. | 340 |
| $H_2$ partial pressure | MPa | 12.5 |
| Catalyst | | CoMo on alumina HR1058 |
| HSV | $h^{-1}$ | 2.75 |

The catalyst used is a NiMo on alumina catalyst of HR1058 type sold by Axens.

The operating conditions of this reactor are such that the effluent XII from the fractionation stage F observes the Euro V specification (especially so that the concentration of sulfur is much less than 10 ppm by weight).

The liquid effluent VI resulting from the separator used in stage B is injected into a hydrocracking reactor R2 (stage D) operating under the conditions given in Table 8:

TABLE 8

| Reactor | | R2 in stage D |
|---|---|---|
| Temperature | ° C. | 370 |
| $H_2$ partial pressure | MPa | 12.5 |
| Catalyst | | Metal on zeolite HYK742 |
| HSV | $h^{-1}$ | 3.3 |

The catalyst used is a metal on zeolite catalyst of HYK742 type sold by Axens.

The effluents from stages C and D are subsequently sent to a separation stage E composed of a chain for recovery of heat and then for high-pressure separation including a recycle compressor (stage H) and making it possible to separate, on the one hand, hydrogen, hydrogen sulfide and ammonia and, on the other hand, the effluent feeding a stripper and then an atmospheric fractionation column (stage F) in order to separate streams concentrated in $H_2S$, naphtha, kerosene, gas oil at the desired specification, and a heavy unconverted liquid fraction (UCO) having a boiling point of greater than 380° C. This heavy unconverted stream is injected into a preheating stage and then into a hydrocracking reactor R3 constituting the second hydrocracking stage G. This reactor is operated under the following conditions set out in Table 9.

TABLE 9

| Reactor | | R3 in stage G |
|---|---|---|
| Temperature | ° C. | 345 |
| H$_2$ partial pressure | MPa | 125 |
| Catalyst | | Metal on amorphous silica/alumina HDK766 |
| HSV | h$^{-1}$ | 1.4 |

The catalyst used is a metal on amorphous silica/alumina catalyst of HDK766 type sold by Axens.

The effluent from R3 (stage G) is subsequently injected into the high-pressure separation stage E downstream of the first hydrocracking stage D and recycled. The flow rate by weight at the inlet of R3 is equal to the flow rate by weight of the VGO feedstock; a bleed corresponding to 1% by weight of the flow rate of the VGO feedstock is taken at the fractionation bottom on the unconverted oil stream.

The produced distillate cut recovered from the fractionation column of stage F is in accordance with the Euro V specifications; in particular, it exhibits less than 10 ppm by weight of sulfur.

The yield of middle distillates of this process is 82% by weight, for an overall conversion of 99% by weight of the hydrocarbons having a boiling point of greater than 380° C.

The total volume of catalyst necessary for this process is 84 m$^3$.

Example 3 (In Accordance With the Invention)

This example is in accordance with the invention, with an innovative separator S installed downstream of the first hydrotreating stage A in order to carry out the separation stage B. In this example, the alternative form of separator according to FIGS. 3a-3b ?? is chosen.

The feedstock I of the hydrotreating reactor R1 is a VGO identical to that treated in Example 1. The VGO feedstock is mixed with a hydrogen stream (1000 Sm$^3$/Sm$^3$ of VGO), then injected into a preheating stage and then into the hydrotreating reactor R1 (stage A) under the conditions set out in Table 10:

TABLE 10

| Reactor | | R1 in stage A |
|---|---|---|
| Temperature | ° C. | 385 |
| H$_2$ partial pressure | MPa | 13 |
| Catalyst | | CoMo on alumina HR1058 |
| HSV | h$^{-1}$ | 1.67 |

The catalyst used is a NiMo on alumina catalyst of HR1058 type sold by Axens.

The effluent II from the hydrotreating reactor of stage A is injected into the innovative separator S, which makes it possible to increase the degree of recovery of the middle distillates at the top. The operating conditions and degrees of recovery of this separator S are given in Table 11:

TABLE 11

| Temperature | ° C. | 350 |
|---|---|---|
| Pressure | MPa | 14 |
| Scrubbing oil flow rate | t/h | 5 |
| Stripping hydrogen flow rate | t/h | 9 |
| Middle distillates recovered at the bottom | t/h | 8.0 |
| H$_2$S + NH$_3$ at the bottom | t/h | 1.3 |

The vapour effluent III resulting from the separator S in stage B is subsequently mixed with an external GO feedstock IV identical to that treated in Example 1. The hydrotreated mixture V is sent, for stage C, to a hydrodesulfurization reactor R4 operating under the conditions given in Table 12:

TABLE 12

| Reactor | | R4 in stage C |
|---|---|---|
| Temperature | ° C. | 340 |
| H$_2$ partial pressure | MPa | 12.5 |
| Catalyst | | CoMo on alumina HR1058 |
| HSV | h$^{-1}$ | 2.75 |

The catalyst used is a NiMo on alumina catalyst of HR1058 type sold by Axens.

The operating conditions of this reactor are such that the effluent XII from the fractionation stage F is at the Euro V specification (in particular, the concentration of sulfur is less than 10 ppm by weight).

The liquid effluent VI resulting from the separator S of stage B is injected into a hydrocracking reactor R2 (stage D) operating under the conditions given in Table 13:

TABLE 13

| Reactor | | R2 in stage D |
|---|---|---|
| Temperature | ° C. | 370 |
| H$_2$ partial pressure | MPa | 12.5 |
| Catalyst | | Metal on zeolite HYK742 |
| HSV | h$^{-1}$ | 3.3 |

The catalyst used is a metal on zeolite catalyst of HYK742 type sold by Axens.

The effluents from stages C and D are subsequently sent to a separation stage E composed of a chain for recovery of heat and then for high-pressure separation including a recycle compressor (stage H) and making it possible to separate:

on the one hand, hydrogen, hydrogen sulfide and ammonia, and, on the other hand, the effluent feeding a stripper and then an atmospheric fractionation column (stage F) in order to separate streams concentrated in H$_2$S, naphtha, kerosene, gas oil at the desired specification, and a heavy unconverted liquid fraction (UCO) having a boiling point of greater than 380° C.

This heavy unconverted stream is injected into a preheating stage and then into a hydrocracking reactor R3 constituting the second hydrocracking stage G. This reactor is operated under the following conditions set out in Table 14:

TABLE 14

| Reactor | | R3 in stage G |
|---|---|---|
| Temperature | ° C. | 345 |
| H$_2$ partial pressure | MPa | 125 |
| Catalyst | | Metal on amorphous silica/alumina HDK766 |
| HSV | h$^{-1}$ | 1.4 |

The catalyst used is a metal on amorphous silica/alumina catalyst of HDK766 type sold by Axens.

The effluent from R3 (stage G) is subsequently injected into the high-pressure separation stage E downstream of the first hydrocracking stage D and recycled. The flow rate by weight at the inlet of R3 is equal to the flow rate by weight of the VGO feedstock; a bleed corresponding to 1% by weight of the flow rate of the VGO feedstock is taken at the fractionation bottom on the unconverted oil stream.

The produced distillate cut recovered from the fractionation column is in accordance with the Euro V specifications; in particular, it has less than 10 ppm by weight of sulfur.

The yield of middle distillates of this process is 83% by weight, for an overall conversion of 99% by weight of the hydrocarbons having a boiling point of greater than 380° C.

In this scheme, 8 t/h of middle distillates resulting from R1 pass through R2, versus 10 t/h in Example 2, i.e. 2 t/h less. In point of fact, the middle distillates injected into the hydrocracking reactor R2 are converted into lighter products, such as petrols or gases, resulting in an overall loss in yield.

The process of Example 3 thus exhibits a greater yield of middle distillates.

The total volume of catalyst necessary for this scheme is 82.8 m$^3$.

Unexpectedly, the use of the innovative separator in stage B under the operating conditions set out makes it possible, in comparison with the "coprocessing" or "cotreatment" processes of Example 1:
- to reduce the initial capital costs and the catalyst consumption in the second hydrocracking stage G, which is reflected by a reduction in the total volume of catalyst necessary for the combined process,
- to limit the cracking both of the feedstock of gas oil type and of the gas oil formed in the hydrotreating stage in the hydrocracking stage, which is reflected by the increase in the yield of middle distillates,
- to minimize the amount of inhibitors, such as H$_2$S and NH$_3$, injected into the hydrocracking reactor and thus to optimize the design thereof while minimizing the amount of catalyst necessary, for an equivalent cycle time.

It makes it possible, in comparison with the use of a simple separator as in Example 2:
- to limit even more the cracking both of the feedstock of gas oil type and of the gas oil formed in the hydrotreating stage in the hydrocracking stage, which is reflected by the increase in the yield of middle distillates.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hydrocracking of hydrocarbon feedstocks containing at least 80% by volume of compounds boiling above 340° C., said process comprising at least the following stages:
   (A) hydrotreating HDT of said feedstocks, in the presence of hydrogen and of at least one hydrotreating catalyst,
   (B) gas/liquid separation S1 of effluent from stage A with a separation device (S) which comprises a chamber compartmentalized into an upstream degassing compartment and a downstream stripping compartment separated with an internal wall, degassing liquid effluent from (A), passing degassed liquid from the degassing compartment to the stripping compartment through at least one opening made in the internal wall and/or by overflowing above said internal wall separating said compartments, stripping degassed effluent so as to obtain a gaseous effluent comprising hydrogen and a middle distillate MD fraction and a liquid effluent, and scrubbing by injection of a scrubbing medium in order to condense heavy compounds resulting from the degassing and/or stripping, in a scrubbing compartment,
   (C) hydrodesulfurizing HDS of the gaseous effluent obtained in stage B and of an external liquid hydrocarbon middle distillate MD feedstock,
   (D) a first hydrocracking HCK1 of the liquid effluent resulting from stage B in the presence of hydrogen and of a hydrocracking catalyst,
   (E) a second gas/liquid separation S2 of liquid effluent obtained in stage D and of liquid effluent obtained in stage C in order to produce a liquid effluent and a gaseous effluent comprising at least hydrogen,
   (F) fractionating the liquid effluent resulting from stage E into at least one effluent comprising converted hydrocarbon products having boiling points of less than 340° C. and an uncoverted liquid fraction having a boiling point of greater than 340° C.,
   (G) a second hydrocracking HCK2 of the unconverted liquid fraction resulting from stage F in the presence of hydrogen and of a hydrocracking catalyst, wherein at least a part of the effluent obtained in the hydrocracking HCK2 is sent to and separated in the separation S2 in (E),
   (H) compressing the gaseous effluent comprising at least hydrogen obtained in separation S2 and recycling in at least one of the hydrodesulfurization HDS (C), or first hydrocracking HCK1 (D).

2. The hydrocracking process according to claim 1, comprising in stage B separating in a first gas/liquid separation S1 effluent obtained in stage A with the separation device (S), which comprises:
   a single chamber delimited by external walls and comprising an external inlet for the effluent, an external liquid outlet (7) and an external gas outlet (5), the chamber being oriented along a substantially vertical or oblique axis and being compartmentalized into at least two compartments (a,b) using at least one wall internal to the chamber (P1,P2,P3,P5) and oriented substantially along said axis,
   the compartments comprising an upstream degassing compartment (a) and a downstream stripping compartment (b), the degassing compartment (a) being in fluidic connection with the external inlet (1) and with a first gas outlet (3) and a degassed liquid outlet (2), the stripping compartment (b) being in fluidic connection with an inlet for degassed liquid (2), a stripping medium inlet (8), a second gas outlet (9) and a liquid outlet (7), the first and second gas outlets (3,9) being in fluidic connection with the external gas outlet (5) of the chamber, the liquid outlet of the stripping compartment (7) being in fluidic connection with the external liquid outlet of the chamber, the passage of the degassed liquid (2) from the outlet of the degassing compartment (a) to the inlet of the stripping compartment (b) being provided by at least one opening (x) made in the wall internal to the chamber (P1,P2,P3) and/or by overflowing above the internal wall (P1) separating the said compartments, so as to obtain a gaseous effluent comprising hydrogen and a middle distillate MD fraction and a liquid effluent.

3. The process according to claim 1, further comprising recycling gaseous effluent comprising at least hydrogen obtained in the separation S2 to hydrotreating HDT (A).

4. The process according to claim 1, in which the hydrocarbon feedstocks treated in the process and sent to the hydrotreating stage A are hydrocarbon feedstocks containing at least 80% by volume of compounds boiling between 370 and 580° C.

5. The process according to claim 1, in which the hydrocarbon feedstocks treated in the process and sent to the hydrotreating stage A are vacuum distillates VDs that are gas oils resulting from direct distillation of crude or from conversion units, distillates originating from desulfurization or hydroconversion of atmospheric residues and/or of vacuum residues, deasphalted oils, feedstocks resulting from biomass or any mixture of at least one of said feedstocks.

6. The process according to claim 1, wherein stage D of the first hydrocracking HCK1 and/or the second hydrocracking HCK2 stage G are carried out at a temperature 320 to 450° C., under a pressure of 3 to 20 MPa, at a space velocity of 0.2 to 4 $h^{-1}$ and with an amount of hydrogen introduced at a liter of hydrogen/liter of hydrocarbon ratio by volume of 200 to 2000 l/l.

7. The process according to claim 1, wherein the hydrotreating HDT stage A is carried out as a temperature of 200 to 390° C., under a pressure of 2 to 16 MPa, at a space velocity of 0.2 to 5 $h^{-1}$ and with an amount of hydrogen introduced at a liter of hydrogen/liter of hydrocarbon ratio by volume of 100 to 2000 l/l.

8. The process according to claim 1, in which the unconverted liquid fraction resulting from stage F used in the hydrocracking HCK2 stage G comprises at least 95% by weight of compounds boiling at a boiling point of 150 to 380° C.

9. The process according to claim 1, in which the external liquid hydrocarbon feedstock treated in the hydrodesulfurization HDS stage C is a straight run gas oil resulting from direct distillation of a crude oil, light vacuum gas oil or light vacuum distillate, or liquid hydrocarbon feedstocks resulting from a coking unit, from a visbreaking unit, from a steam cracking unit and/or from a catalytic cracking (Fluid Catalytic Cracking) unit, or a gas oil feestock resulting from conversion of biomass.

10. The process according to claim 2, in which the chamber of the said separation device (S) comprises a third scrubbing compartment (c), downstream of the first two compartments (a,b), and positioned above them in the chamber, and optionally comprising a coalescer pad.

11. The process according to claim 10, in which the separation S1 stage B is carried out with the following successive substages:
    degassing fluid to be separated into a liquid phase and into a gas phase by getting the fluid closer to its thermodynamic equilibrium in the first degassing compartment (a),
    stripping by injection of a stripping medium in order to evaporate a part at least of light components dissolved in liquid obtained by the degassing stage in the stripping compartment (b),
    scrubbing by injection of a scrubbing medium in order to condense heavy compounds resulting from the degassing and/or stripping in the scrubbing compartment (c).

12. The process according to claim 1, in which the separation S1 stage B is carried out in the separation device operating at a temperature of 50 to 450° C., and at a pressure corresponding to the outlet pressure of the effluent obtained in the hydrotreating stage A decreased by pressure drops.

13. The process according to claim 10, in which the separation S1 stage B is carried out so that the section for passage of the fluid in the degassing compartment (a) and/or in the stripping compartment (b), and/or in the scrubbing compartment (c), is sufficient to limit velocity of the gas below critical velocity for entrainment of droplets.

* * * * *